US007512069B2

(12) United States Patent
Hedayat et al.

(10) Patent No.: US 7,512,069 B2
(45) Date of Patent: Mar. 31, 2009

(54) IP PACKET IDENTIFICATION METHOD AND SYSTEM FOR TCP CONNECTION AND UDP STREAM

(75) Inventors: Kaynam Hedayat, Chestnut Hill, MA (US); Daniel S. Pyrik, Lowell, MA (US); Steven A. DesRochers, Londonderry, NH (US)

(73) Assignee: EXFO Service Assurance, Inc., Chelmsford, MA (US)

( * ) Notice: Subject to any disclaimer, the term of this patent is extended or adjusted under 35 U.S.C. 154(b) by 650 days.

(21) Appl. No.: 09/860,287

(22) Filed: May 18, 2001

(65) Prior Publication Data

US 2002/0039371 A1 Apr. 4, 2002

Related U.S. Application Data

(60) Provisional application No. 60/264,354, filed on Jan. 26, 2001, provisional application No. 60/205,280, filed on May 18, 2000.

(51) Int. Cl.
*G01R 31/08* (2006.01)
(52) U.S. Cl. ..................... 370/230.1; 370/235; 370/252; 370/516; 714/55; 714/814; 709/233; 709/234
(58) Field of Classification Search ................. 370/252, 370/241, 253, 232, 230, 230.1, 235, 242, 370/244, 245, 248, 254, 352, 356, 412, 428, 370/429, 503–507, 516–519, 528; 375/226; 702/69; 714/1, 2, 55, 25, 798, 799, 814; 709/220, 233, 234, 248
See application file for complete search history.

(56) References Cited

U.S. PATENT DOCUMENTS

| 4,380,029 | A |   | 4/1983  | Bode ............................ 360/48 |
| 4,569,042 | A | * | 2/1986  | Larson ........................ 370/250 |
| 5,309,428 | A |   | 5/1994  | Copley et al. .................. 370/17 |
| 5,337,308 | A |   | 8/1994  | Fan ............................... 370/60 |
| 5,822,317 | A |   | 10/1998 | Shibata ....................... 370/474 |
| 5,878,032 | A | * | 3/1999  | Mirek et al. ................. 370/252 |
| 5,892,924 | A | * | 4/1999  | Lyon et al. .................. 709/245 |
| 5,923,902 | A |   | 7/1999  | Inagaki |
| 5,953,483 | A |   | 9/1999  | Van Gestel ................... 386/65 |
| 5,966,387 | A |   | 10/1999 | Cloutier ...................... 370/516 |
| 6,006,270 | A |   | 12/1999 | Kobunaya |

(Continued)

*Primary Examiner*—Aung S Moe
*Assistant Examiner*—Christopher P. Grey
(74) *Attorney, Agent, or Firm*—Foley & Lardner LLP; Joseph M. Maraia; Christopher Everett

(57) ABSTRACT

A method of measuring jitter of a packet flow includes identifying the data packet flow at each of a first and second network locations by analyzing the data fields of each of the packets in the flow. The method associates a transmit time code with each packet transmitted from the first location, and associates a receive time code with each packet received at the second location. The method calculates inter-arrival times for consecutive pairs of packets by (i) subtracting the transmit time code of the first packet from the transmit time code of the second packet, (ii) subtracting the receive time code associated with the first packet from the receive time code associated with the second packet, and (iii) subtracting the results. The method includes calculating a jitter value as a smoothed version of two or more inter-arrival times, smoothed over a predetermined number of pairs of consecutive packets.

15 Claims, 2 Drawing Sheets

U.S. PATENT DOCUMENTS

| | | | |
|---|---|---|---|
| 6,058,102 A * | 5/2000 | Drysdale et al. | 370/252 |
| 6,104,729 A * | 8/2000 | Hellum et al. | 370/503 |
| 6,445,681 B1 * | 9/2002 | Pogrebinsky | 370/252 |
| 6,545,979 B1 * | 4/2003 | Poulin | 370/241.1 |
| 6,615,262 B2 * | 9/2003 | Schweitzer et al. | 709/224 |
| 6,665,317 B1 * | 12/2003 | Scott | 370/516 |
| 6,680,955 B1 * | 1/2004 | Le | 370/477 |
| 6,721,272 B1 * | 4/2004 | Parnafes et al. | 370/235 |
| 6,785,237 B1 * | 8/2004 | Sufleta | 370/236 |
| 6,925,062 B2 * | 8/2005 | Tanaka et al. | 370/241.1 |
| 2005/0123003 A1 * | 6/2005 | Bordonaro et al. | 370/516 |

* cited by examiner

IP PACKET IDENTIFICATION METHOD AND SYSTEM FOR TCP CONNECTION AND UDP STREAM

CROSS-REFERENCE TO RELATED APPLICATIONS

This application is related to the following U.S. applications, of common assignee, from which priority is claimed, and the contents of which are incorporated herein in their entirety by reference:

"IP Packet Identification Method and System For TCP Connection and UDP Stream," U.S. Provisional Patent Application Ser. No. 60/264,354 filed on Jan. 1, 2001; and, "System For And Method Of Measuring And Reporting Quality And Performance Metrics Associated With Network-Based Services," U.S. Provisional Patent Application Ser. No. 60/205,280 filed on May 18, 2000.

This application is related to the following U.S. applications, of common assignee:

"Non-Deterministic Software Delay Estimation Method And System For Packet Based Data Network Systems," U.S. patent application Ser. No. 09/860,296, filed on May 18, 2001 and claimin priority to U.S Provisional Applicaion Ser. Nos. 60/264,463 filed on Jan. 26, 2001, and 60/205,280, filed on May 18, 2000;

"Method And System For Transmit Time Stamp Insertion In A Hardware Time Stamp System For Packetized Data Networks," U.S. patent application Ser. No. 09/860,297, filed on May 18, 2001 and claiming priority to U.S. Provisional Appliction No. 60/264,356, filed on Jan. 26, 2001;

"Hardware Time Stamping And Registration Of Packetized Data Method And System," U.S. patent application Ser. No. 09/860,295, filed on May 18, 2001 and claiming priority to U.S. Provisional Applicaion No. 60/205,280, filed on May 18, 2001;

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to packetized data networks, and more particularly, to measuring the packet jitter characteristics of packetized data networks.

The invention measures the jitter (also referred to herein as "packet jitter") of TCP connections or UDP streams without altering the behavior of the network. This type of non-intrusive measurement is also referred to herein as a "passive measurement."

Packet jitter is an important characteristic of real-time traffic flows such as VoIP or streaming media (e.g., video). High jitter can often lead to poor quality of the media stream. Jitter is the overwhelming cause of poor quality in VoIP applications. Packet jitter is related to packet delay, and can best be described as a variation in packet delay. In a packet switched network, not all packets experience uniform delay across the network. Packets may take different paths between the same network endpoints. Further, routers and other network components may introduce variable delays as a result of congestion and other factors. Jitter can occur in a public network when an intermediate switch along the network path is busy with another unrelated packet. When this occurs, the second packet is held at the switch until transmission of the first packet is complete. The amount of delay is variable and unpredictable, since packets typically vary in length. If the jitter exceeds the ability of the receiving device to compensate through buffering, voice quality will suffer or the signal will be completely obliterated. The ability to passively measure the jitter of any type of UDP or TCP flow can provide network operators valuable information about the performance of their networks, and assist them in troubleshooting network issues.

In prior art systems, the jitter of a network may be measured by performing an active measurement, i.e., measuring the jitter of packets that the test itself injects into the network. One disadvantage to this configuration is that the injected test packets of an active measurement may alter the behavior of the network under test, thus skewing the results. Another disadvantage is that the network may treat test packets differently than "real" packets, such as packets within an H.323 voice over IP stream.

It is an object of the present invention to substantially overcome the above-identified disadvantages and drawbacks of the prior art.

SUMMARY OF THE INVENTION

The method and system described herein can measure the jitter of any IP (Internet Protocol) traffic flow that is present on the network, without changing the traffic flow or network behavior.

The invention measures the jitter (also referred to herein as "packet jitter") of TCP over IP connections or UDP streams without altering the behavior of the network. This type of non-intrusive measurement is also referred to herein as a "passive measurement."

The foregoing and other objects are achieved by the invention which in one aspect comprises a method of measuring jitter characteristics of a specific data packet flow, including one or more packets, at a first location on a network relative to a second location on the network. The method includes identifying, at each one of the first and second locations on the network, the specific data packet flow by analyzing data in one or more data fields of each of the packets in the packet flow. The method further includes associating a transmit time code with each of the packets transmitted from the first location, and associating a receive time code with each of the packets received at the second location. The method also includes calculating, for each packet, a propagation delay from the first location to the second location by subtracting the associated transmit time code from the associated receive time code. The method includes calculating, for each pair of consecutive packets received at the second location, a delay variation as the difference between the propagation delays calculated for the pair of consecutive packets. The method also includes calculating a jitter value as an average delay variation, averaged over a predetermined number of pairs of consecutive packets.

In another embodiment of the invention, the packet flow includes an IP packet flow.

In another embodiment of the invention, identifying the specific data flow further comprises analyzing data in four fields of each of the packets, including a source address field, a source port field, a destination address field and a destination port field.

Another embodiment of the invention further comprises identifying a particular data packet within a data flow by analyzing data in an IP identifier field of each of the packets.

In another aspect, the invention comprises a method of measuring jitter characteristics of a specific data packet flow, including one or more packets, at a first location on a network relative to a second location on the network. The method includes identifying, at each one of the first and second locations on the network, the specific data packet flow by analyzing data in one or more data fields of each of the packets in the packet flow. The method further includes associating a transmit time code with each of the packets transmitted from the first location, and associating a receive time code with each of the packets received at the second location. The method further includes calculating, for each consecutive pair of packets, an inter-arrival time by (i) subtracting the transmit time code associated with the first packet from the transmit time code associated with the second packet so as to produce a transmit time delta, (ii) subtracting the receive time code associated with the first packet from the receive time code associated with the second packet so as to produce a receive time delta, and (iii) subtracting the transmit delta from the receive delta. The method also includes calculating a jitter value as a smoothed version of two or more inter-arrival times, smoothed over a predetermined number of pairs of consecutive packets.

In another embodiment of the invention, the smoothed version of the two or more inter-arrival times is characterized as $Jn=Jn-1+(|D(pn-1,pn)|-Jn-1)/G$.

In another embodiment of the invention, the data packet flow includes an IP packet flow.

In another aspect, the invention comprises a method of passively identifying individual packets within an IP packet flow at a first location on a network. The method includes analyzing, for each individual packet passing the first location on the network, data in four fields of the packet, including a source address field, a source port field, a destination address field and a destination port field, so as to identify a particular IP packet flow. The method also includes analyzing, for each individual packet within the particular packet flow, data in the IP identifier field of the packet so as to identify the individual packet.

Another embodiment of the invention further includes identifying a packet loss event by identifying an individual packet that occurs at the first location and not the second location, or an individual packet that occurs at the second location and not the first location.

Another embodiment of the invention further includes identifying the flow and individual packets at a second location on the network, associating a time code with each packet at the first location, and associating a time code with each packed at the second location.

Another embodiment of the invention further includes calculating a latency value for each individual packet by subtracting the time code associated with the packet at the first location from the time code associated with the packet at the second location Another embodiment of the invention further includes calculating a jitter value by subtracting the latency values corresponding to two consecutive packets.

Another embodiment of the invention further includes calculating a smoothed jitter value by combining two or more jitter values according to a predetermined smoothing formula.

Another embodiment of the invention further includes calculating a smoothed jitter value by combining two or more jitter values according to the formula given by $$Jn=Jn-1+(|D(pn-1,pn)|-Jn-1)/G.$$

In another aspect, the invention comprises a system for measuring jitter characteristics of a specific data packet flow, including one or more packets, at a first location on a network relative to a second location on the network. The system includes a controller at the first location that observes packets on the network, and analyzes data in one or more data fields of each of the packets in the packet flow so as to identify the specific data packet flow and the individual packets. The controller also associates a transmit time code with each of the packets as the packet traverses the first location. The system further includes a responder at the second location that observes packets on the network, and analyzes data in one or more data fields of each of the packets in the data flow so as to identify the specific data packet flow and the individual packets. The responder also associates a receive time code with each of the packets as the packet traverses the second location, so as to form a packet-time code association for each packet. The responder passes each packet and the associated time code to the controller. The controller calculates, for each packet, a propagation delay from the first location to the second location by subtracting the associated transmit time code from the associated receive time code. The controller further calculates, for each pair of consecutive packets received at the second location, a delay variation as the difference between the propagation delays calculated for the pair of consecutive packets. The controller also calculates a jitter value as an average delay variation, averaged over a predetermined number of pairs of consecutive packets.

In another embodiment of the invention, the packet flow includes an IP packet flow.

In another embodiment of the invention, the one or more data fields includes a source address field, a source port field, a destination address field and a destination port field.

In another embodiment of the invention, the controller analyzes, for each of the packets, a source address field, a source port field, a destination address field and a destination port field, so as to identify the particular data flow In another embodiment of the invention, the responder analyzes, for each of the packets, an IP identifier field, so as to identify a particular data packet within the data flow.

In another embodiment of the invention, the responder passes each packet-time code association to the controller via an out of band channel.

In another embodiment of the invention, the responder passes each packet-time code association to the controller via the same channel utilized by the packet flow.

Another embodiment of the invention further includes a configuration device for providing configuration data to the controller and to the responder, and for receiving information regarding the packet flow, the individual packets, and the jitter values.

In another embodiment of the invention, the configuration device communicates with the controller and with the responder via an out of band channel.

In another embodiment of the invention, the configuration device communicates with the controller and the responder via the same channel utilized by the packet flow.

In another aspect, the invention comprises a system for measuring jitter characteristics of a specific data packet flow, including one or more packets, at a first location on a network relative to a second location on the network. The system includes a controller at the first location that observes packets on the network, and analyzes data in one or more data fields of each of the packets in the packet flow so as to identify the specific data packet flow and the individual packets. The controller associates a transmit time code with each of the packets as the packet traverses the first location. The system also includes a responder at the second location that observes packets on the network, and analyzes data in one or more data fields of each of the packets in the data flow so as to identify the specific data packet flow and the individual packets. The responder associates a receive time code with each of the packets as the packet traverses the second location, so as to form a packet-time code association for each packet. The responder further passes the packet-time code associations to the controller, and the controller calculates an inter-arrival time for each consecutive pair of packets. The controller calculates the inter-arrival time by subtracting the transmit time code associated with the first packet from the transmit time code associated with the second packet so as to produce a transmit time delta, subtracting the receive time code associated with the first packet from the receive time code associated with the second packet so as to produce a receive time delta, and subtracting the transmit delta from the receive delta. The controller further calculates a jitter value as a smoothed version of two or more inter-arrival times, smoothed over a predetermined number of pairs of consecutive packets.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
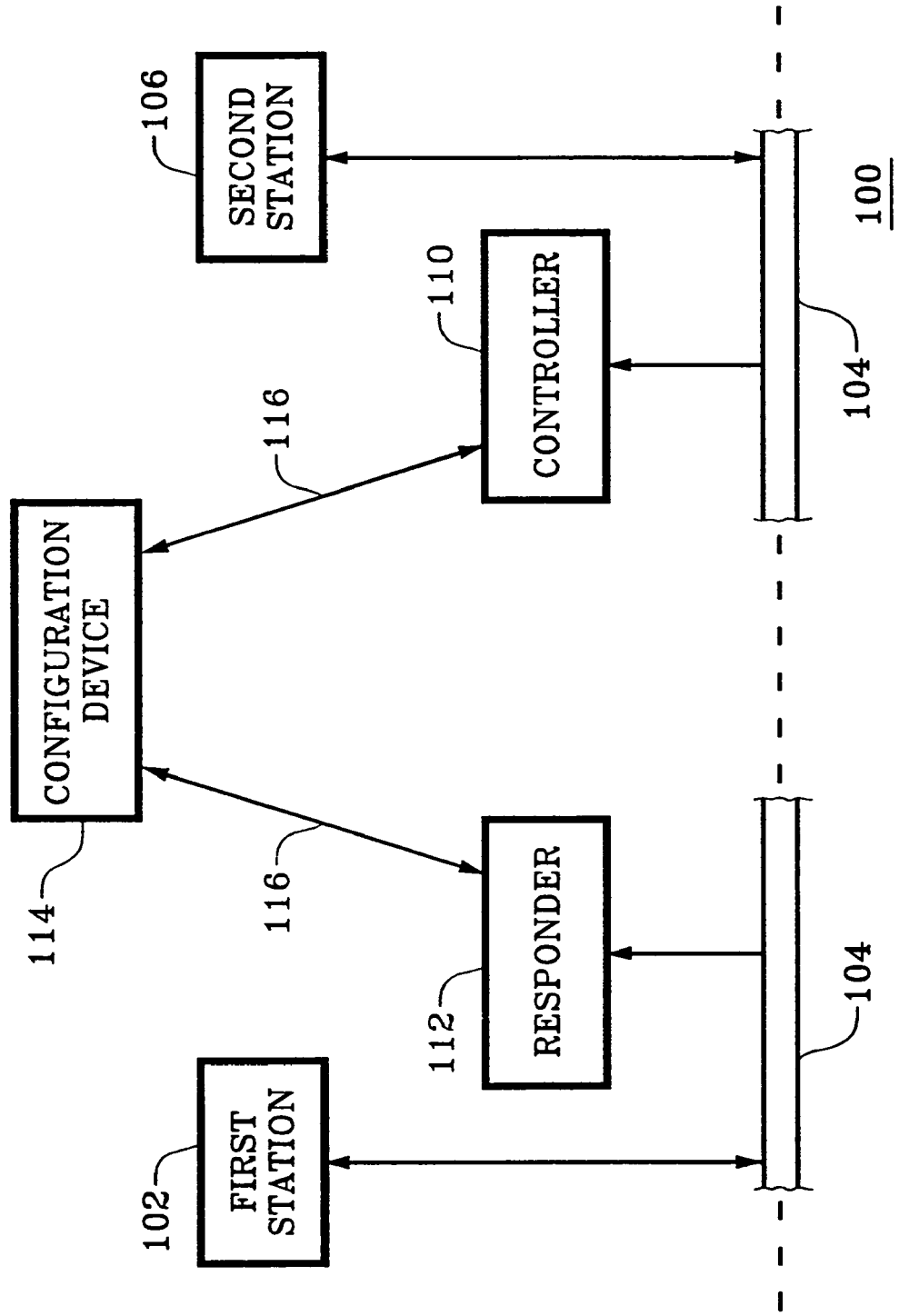
FIG. 1 shows a block diagram view of one preferred embodiment of a system for measuring jitter characteristics of a packet flow on a network at a first location with respect to a second location.
Figure 2:
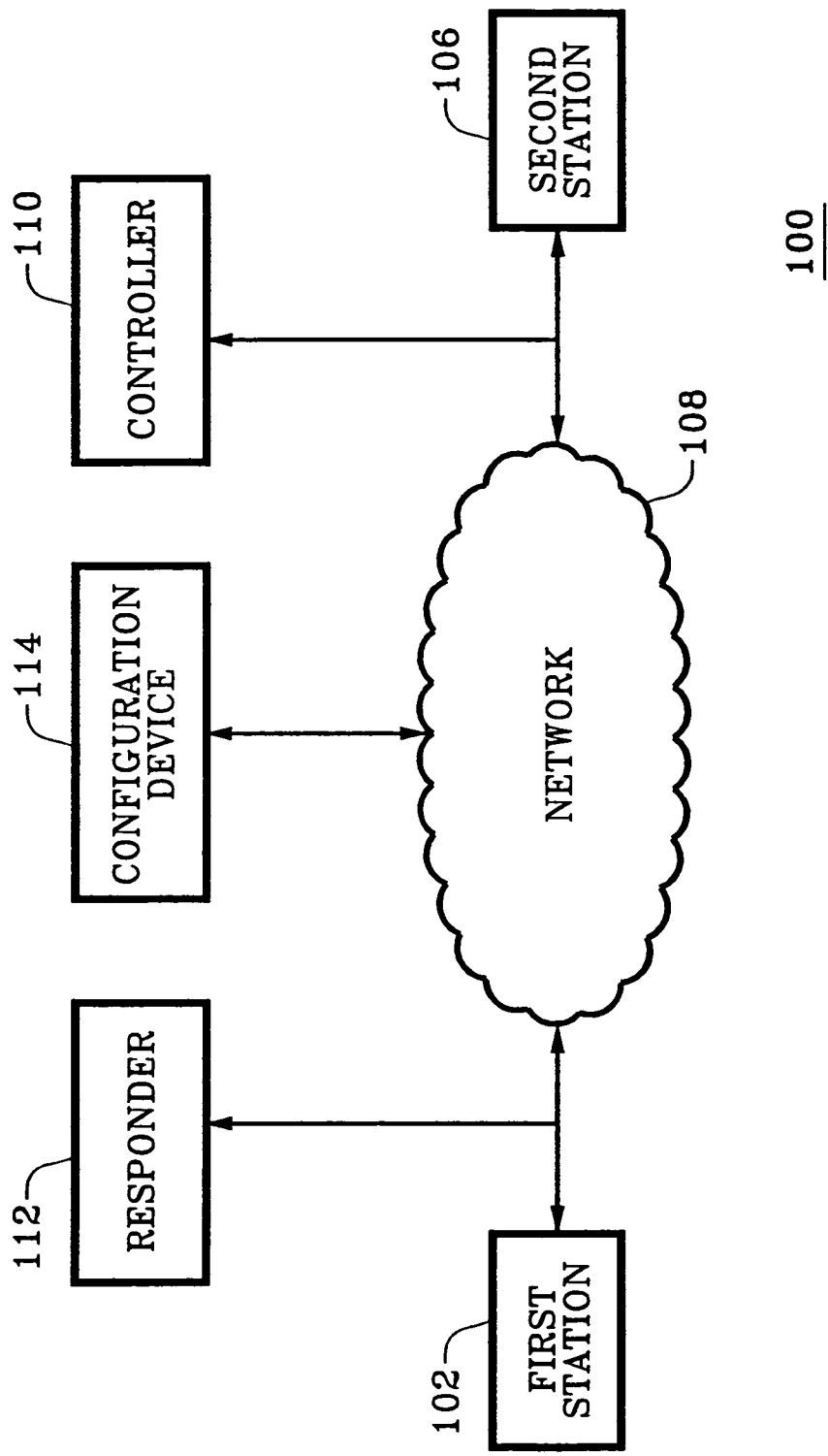
FIG. 2 shows a more generalized view of the embodiment shown in FIG. 1, where the first station communicates with a second station via a network system.

FIG. 1 shows a block diagram view of one preferred embodiment of a system 100 for measuring jitter characteristics of a packet flow on a network at a first location with respect to a second location. The system 100 includes a first station 102 coupled to network media 104, and a second station 106 coupled to the same network media 104. Although the embodiment shown in FIG. 1 describes two stations communicating on the same physical network media 104, other embodiments may include two network stations 102 and 106 communicating on a network system through one or more network interface devices. Such interface devices may include routers, gateways, bridges, and other network devices known to those in the art. FIG. 2 shows a more generalized view of the embodiment shown in FIG. 1, where the first station 102 communicates with a second station via a network system 108. The network system 108 may include a single physical network medium 104 as shown in FIG. 1, such that the two stations reside in the same building, or the network system 108 may include the Internet, such that the two stations are located in different parts of the world. A controller device 110 is located on the network between the first station 102 and the second station 106, and in close proximity to the second station 106. A responder device 112 is located on the network between the first station 102 and the second station 106, and in close proximity to the first station 102. In this embodiment, the second station originates the packet flow and the first station terminates the packet flow.

The system also includes a configuration device 114 for providing configuration data to the first station 102 and the second station 106, and for receiving test results from the stations. In one embodiment, the configuration device 114 communicates with the first station 102 and the second station via dedicated communications paths 116, as shown in FIG. 1. In other embodiments, the configuration device communicates with the first station 102 and the second station 106 via the network through a communications protocol (e.g., TCP over IP), as shown in FIG. 2. Configuration data may include, but is not limited to, flow identification (i.e., Source Address field, the Source Port field, the Destination Address field, and the Destination Port field), how often to respond with test results, which test results to collect and report To measure jitter, the system 100 uniquely identifies a particular flow on the network, and time-stamps the packets of that particular flow at the controller 110 and again at the responder 112. The controller 110 and the responder 112 perform passive measurements, i.e., they do not modify or affect the packet flow in any way, but merely observe the packets as they propagate past them on the network. In this description, a "time-stamp" is defined as an association between a time code and a data packet. The system uniquely identifies a packet flow by monitoring data fields of individual packets within the packet flow. In one embodiment, the system 100 identifies an IP flow by monitoring four existing fields within the packets: the Source Address field, the Source Port field, the Destination Address field, and the Destination Port field. The system 100 identifies particular packets within the flow via the IP Identifier field that is in the IP header of the IP packet. In other embodiments of the invention, the system 100 monitors similar fields within the packets that the network uses for packet routing for a particular transmission protocol.

The controller device 110 includes a first time source 118 for generating and maintaining a chronological time code. Likewise, the responder 112 includes a second time source 120. The time-stamping operation is identical for the controller 110 and the responder 112. As each packet of a particular flow passes the controller 110, the controller 110 records the packet (forming a packet image), samples the time source 118 and associates the time code with the packet image. As each packet of a particular flow passes the responder 112, the responder 112 records the packet (forming a packet image), samples the second time source 120 and associates the time code with the packet image. Once the controller 110 and the responder 112 have collected a predetermined amount of packet information, the responder device 112 sends all of its timestamp/identification information to the controller device 110. In one embodiment, the responder 112 sends this information to the controller via an out-of-band data channel. In another embodiment, the responder 112 sends this information to the controller 110 via the network (e.g., via TCP over IP). In yet another embodiment, the responder 112 sends this information to the controller 110 via the same channel utilized by the data packets. The controller device 110 measures the jitter of the packet flow from the first station 102 to the second station 106 by using the time-stamps created at the controller 110 and the timestamps created at the responder 112 in the formulae described below. In other embodiments, the controller 112 sends its time-stamp/identification information to the responder 112 (via any of the channels described herein), and the responder 112 performs the jitter calculations. In yet another embodiment, both the controller 110 and the responder 112 send their respective timestamp/identification information to a third device (via any of the channels described herein), and the third device performs the jitter calculations.

In this description, the time-stamp of a packet created at the controller is designated $T_n$, and the timestamp of a packet created at the responder is designated $R_n$, where the subscript n indicates the number of the packet within the flow. The variance in delay between two packets, designated herein by the parameter D, is given by the formula:

$$D=(R_2-T2)-(R_1-T1)=(R_2-R_1)-(T_2-T_1).$$

Note that the time code generators (i.e., clocks) used to create the timestamps at the controller 110 and the responder 112 do not need to be synchronized to use this formula. The system 100 works with the difference in transit times from the controller 110 to the responder 112, rather than the absolute values of the transit times themselves. An alternative way to state this is that the system 100 measures "inter-arrival times" of consecutive packets, i.e., differences in when a packet arrives at a location with respect to when it was transmitted from a source location. The right side of the equation above shows that the first quantity, $R_2-R_1$ (referred to herein as the "receive delta"), involves two values generated by the same clock (i.e., the one at the responder). Similarly, the second quantity, $T_2-T_1$ (referred to herein as the "transmit delta"), also involves two values generated by the same clock (i.e., the one at the controller). If there is no difference between the transit times of the two consecutive packets, receive delta and the transmit delta should be the same; thus, the inter-arrival time should be zero.

In one embodiment of the invention, the average jitter J of a flow is measured by continuously measuring the variance in delay of each successive packet to the previous packet. For the the $n^{th}$ packet received at the responder 112, the average jitter $J_n$ is calculated in one embodiment by using the formula:

$$J_n=J_{n-1}+(|D(p_{n-1},p_n)|-J_{n-1})/G,$$

where $D(p_{n-1},p_n)$ is the variance in delay D computed using the $n^{th}$ and $n-1^{th}$ packets, and $J_{n-1}$ previously calculated average jitter value. G is a gain parameter, which has the effect of smoothing out the impact of any large delay spikes. In this embodiment, the gain parameter G is set to 16, although other values of G may also be used. For the first two packets the responder 112 receives, the jitter $J_2$ is simply $D(p_1, P_2)$, and for the third packet, $J_3=J_2+(|D(P_2, P_3)-J_2)/G$. The minimum and maximum jitter may also be computed by storing the smallest and largest value of D computed by the first formula given above. The system 100 may also characterize the jitter by calculating various statistical values of a set of jitter measurements, such as the median, the variance, and other statistical values known in the art. In general, the average jitter $J_n$ is a "smoothed" version of the values of D gathered for a set of packets passing from the controller 110 to the responder 112. The formula for $J_n$ described herein is merely one way of performing the smoothing operation. In other embodiments, other similar operations for smoothing data known in the art may also be used (e.g., arithmetic mean, geometric mean, etc.)

One advantage of passively measuring the jitter of a pre-existing IP traffic flow is that it gives a more accurate representation of the behavior of the network under test, because the network behavior will remain unaltered by external factors such as injected test messages. As described herein, prior art systems typically measure jitter via active measurements by injecting test packets into the network between the two devices. However, the characteristics of the test packets may be different than the packets of a real flow, such as a VoIP connection. Network components such as routers, gateways and bridges situated between the measurement devices may treat test packets differently than VoIP or other real-time flows.

In some embodiments, the configuration device 114 provides information to the controller 110 and responder identifying a single packet flow, so that the system 100 only characterizes the jitter of that particular flow. In other embodiments, the configuration device 114 provides information to the controller 110 and responder 112 identifying all flows passing between the first station 102 and the second station 106, or some subset of the total number of flows.

Although an embodiment described herein teaches a non-passive jitter measurement technique, the underlying method of identifying unique packets (and similarly identifying flows) by observing existing fields within the packets is useful in and of itself, and may also be employed for other network analysis applications. For example, in the system shown in FIG. 1, once the controller 110 and the responder 112 are configured to identify packets within a particular flow as described herein, the controller 110 and the responder 112 can cooperate to identify dropped (i.e., missing) packets. When the controller 110 receives packet information from the responder (e.g., via an out of band channel as described herein), a packet observed at the controller 110 but not observed at the responder may be classified as a dropped packet. Similarly, once the controller 110 and the responder 112 have identified packets on the network and have associated time codes to the packets, the one-way latency (i.e., propagation time from the controller to the responder) of those packets may also be calculated. An important and useful aspect to these network analysis applications is their passive nature. The determination of missing packets, one way latency, etc., are all done using existing packet traffic, and without inserting special test packets that are not part of normal network traffic.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of measuring jitter characteristics of a specific data packet flow of normal network traffic, including one or more packets, at a first location on a network relative to a second location on the network, comprising:

identifying at each one of the first and second locations on the network, a specific IP packet flow of normal network traffic by analyzing data in one or more data fields of each of the IP packets in the IP packet flow and identifying each IP packet in the IP data flow at said locations;

associating passively a transmit time code with each identifed IP packet in the IP packet flow transmitted from the first location associating passively a receive time code with each of the identified IP packets received at the second location the transmit and receive time codes derived from respective time code generators without requiring synchronization therebetween, and calculating, for each consecutive pair of IP packets, an inter-arrival time by (i) subtracting the transmit time code associated with the first IP packet from the transmit time code associated with the second IP packet so as to produce a transmit time delta, (ii) subtracting the receive time code associated with the first IP packet from the receive time code associated with the second IP packet so as to produce a receive time delta, and (iii) subtracting the transmit delta from the receive delta; and calculating a jitter value as a smoothed version of two or more inter-arrival times, smoothed over a predetermined number of pairs of consecutive IP packets, wherein the jitter value is indicative of network performance, wherein the smoothed version of the two or more inter-arrival times is characterized as $J_n=J_{n-1}+(|D(p_{n-1},p_n)|-J_{n-1})/G$, wherein $J_n$ is an average jitter value, $J_{n-1}$ is a previously calculated average jitter value, $D(p_{n-1},p_n)$ is a variance in delay computed using the $n^{th}$ and $n-1^{th}$ packets, and G is a gain parameter.

2. A method according to claim 1, wherein identifying the IP packet flow further comprises analyzing data in four fields of each of the IP packets, including a source address field, a source port field, a destination address field and a destination port field.

3. A method according to claim 1, further comprising identifying a particular IP packet within the IP packet flow by analyzing data in an IP identifier field of each of the IP packets.

4. A method according to claim 1, wherein associating passively each of the transmit and receive time codes with each identified IP packet is accomplished without modifying the specific data packet flow.

5. A method of passively identifying individual packets within an IP packet flow of normal network traffic at a first location on a network, comprising:

for each individual IP packet passing the first location on the network, analyzing data in four fields of the IP packet, including a source address field, a source port field, a destination address field and a destination port field so as to identify a particular IP packet flow of normal network traffic;

for each individual IP packet within the particular packet flow, analyzing data in an IP identifier field of the IP packet so as to identify the individual IP packet in the particular IP packet flow;

identifying the IP packet flow and individual IP packets at a second location on the network, associating a time code with each IP packet at the first location, and associating a time code with each IP packet at the second location, wherein the associated time codes at the first and second location are derived from respective time code generators without requiring synchronization therebetween;

calculating a latency value for each individual IP packet by subtracting the time code associated with the IP packet at the first location from the time code associated with the IP packet the second location;

calculating a jitter value by subtracting the latency values corresponding to two consecutive IP packets; and calculating a smoothed jitter value by combining two or more jitter values according to the formula given by $J_n=J_{n-1}+(|D(p_{n-1},p_n)|-J_{n-1})/G$, wherein $J_n$ is an average jitter value, $J_{n-1}$ is a previously calculated average jitter value, $D(p_{n-1},p_n)$ is a variance in delay computed using the $n^{th}$ and $n-1^{th}$ packets, and G is a gain parameter.

6. A system for measuring jitter characteristics of a specific data packet flow of normal network traffic, including one or more packets, at a first location on a network relative to a second location on the network, comprising:

a controller at the first location for observing packets on the network, analyzing data in one or more data fields of each of the packets in the packet flow so as to identify the specific IP packet flow and to identify the individual IP packets, and associating passively a transmit time code with each of the IP packets as the packet traverses the first location;

a responder at the second location for observing packets on the network, analyzing data in one or more data fields of each of the packets in the data flow so as to identify a specific IP packet flow and to identify the individual IP packets, and associating passively a receive time code with each of the IP packets as the packet traverses the second location, so as to form a packet-time code association for each IP packet;

wherein the responder passes the packet-time code associations to the controller, and the controller calculates, for each consecutive pair of IP packets, an inter-arrival time without requiring synchronization to the responder, by (i) subtracting the transmit time code associated with the first IP packet from the transmit time code associated with the second IP packet so as to produce a transmit time delta, (ii) subtracting the receive time code associated with the first IP packet from the receive time code associated with the second IP packet so as to produce a receive time delta, (iii) subtracting the transmit delta from the receive delta, and the controller further calculates a jitter value as a smoothed version of two or more inter-arrival times, smoothed over a predetermined number of pairs of consecutive IP packets, wherein the jitter value is indicative of network performance, (iv) calculating a latency value for each individual IP packet by subtracting the time code associated with the IP packet at the first location from the time code associated with the IP packet at the second location, (v) calculating a jitter value by subtracting the latency values corresponding to two consecutive IP packets, and (vi) calculating a smoothed jitter value by combining two or more jitter values according to the formula given by $J_n=J_{n-1}+(|D(p_{n-1},p_n)|-J_{n-1})/G$, wherein $J_n$ is an average jitter value, $J_{n-1}$ is a previously calculated average jitter value, $D(p_{n-1},p_n)$ is a variance in delay computed using the $n^{th}$ and $n-1^{th}$ packets, and G is a gain parameter.

7. A system according to claim 6, wherein the one or more data fields includes a source address field, a source port field, a destination address field and a destination port field.

8. A system according to claim 6, wherein the controller analyzes, for each of the IP packets, a source address field, a source port field a destination address field and a destination port field, so as to identify the particular IP packet flow.

9. A system according to claim 8, wherein the responder analyzes, for each of the IP packets, an IP identifier field, so as to identify a particular IP packet within the IP packet flow.

10. A system according to claim 6, wherein the responder passes each packet-time code association to the controller via an out of band channel.

11. A system according to claim 6, wherein the responder passes each packet-time code association to the controller via the same channel utilized by the IP packet flow.

12. A system according to claim 6, further including a configuration device for providing configuration data to the controller and to the responder, and for receiving infomation regarding the IP packet flow, the individual IP packets, and the jitter values.

13. A system according to claim 12, wherein the configuration device communicates with the controller and with the responder via an out of band channel.

14. A system according to claim 12, wherein the configuration device communicates with the controller and the responder via the same channel utilized by the packet flow.

15. A system according to claim 6, wherein associating passively each of the transmit and receive time codes with each identified IP packet accomplished without modifying the specific data packet flow.

* * * * *